(12) United States Patent  
Koch

(10) Patent No.: US 6,915,790 B2  
(45) Date of Patent: Jul. 12, 2005

(54) PISTON ENGINE AND ASSOCIATED OPERATING PROCESS

(75) Inventor: Charles Robert Koch, Edmonton (CA)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/350,103

(22) Filed: Jan. 24, 2003

(65) Prior Publication Data

US 2003/0154965 A1 Aug. 21, 2003

(30) Foreign Application Priority Data

Jan. 26, 2002 (DE) .......................................... 102 03 032

(51) Int. Cl.⁷ .............................. F02M 25/07; F01L 1/34
(52) U.S. Cl. ............................... 123/568.14; 123/90.11; 123/568.21
(58) Field of Search ....................... 123/568.21, 568.11, 123/568.14, 90.11, 90.15, 90.16, 90.17, 90.18, 347, 348, 58.8

(56) References Cited

U.S. PATENT DOCUMENTS

| | | | | |
|---|---|---|---|---|
| 4,700,684 A | * | 10/1987 | Pischinger et al. | 123/568.14 |
| 5,123,397 A | * | 6/1992 | Richeson | 123/568.14 |
| 5,603,292 A | * | 2/1997 | H.ang.kansson | 123/568.14 |
| 6,412,458 B2 | * | 7/2002 | Kawasaki et al. | 123/568.14 |
| 6,637,404 B2 | * | 10/2003 | Fuerhapter et al. | 123/568.14 |
| 6,711,489 B2 | * | 3/2004 | Haskara et al. | 123/568.14 |
| 2002/0040708 A1 | * | 4/2002 | Chmela et al. | 123/568.14 |
| 2002/0046741 A1 | * | 4/2002 | Kakuho et al. | 123/568.14 |

FOREIGN PATENT DOCUMENTS

| | | |
|---|---|---|
| DE | 19824915 C1 | 2/1999 |
| DE | 19928824 A1 | 12/2000 |
| DE | 198 19 937 C1 | 4/2001 |
| EP | 1104844 A2 | 6/2001 |

* cited by examiner

Primary Examiner—Willis R. Wolfe, Jr.  
(74) Attorney, Agent, or Firm—Crowell & Möring LLP

(57) ABSTRACT

A process operates a piston engine in which at least one intake valve and at least one exhaust valve are assigned to each of the cylinders of the piston engine. The piston engine is equipped with a valve actuator permitting variable opening and closing times. An engine control system of the piston engine determines a current actual value of an exhaust gas mass proportion. The value forms the contents of the cylinders together with a fresh gas mass proportion after the fresh gas has been supplied and before combustion. The engine control system actuates the valve actuator in order to set a desired value for the exhaust gas mass proportion.

16 Claims, 1 Drawing Sheet

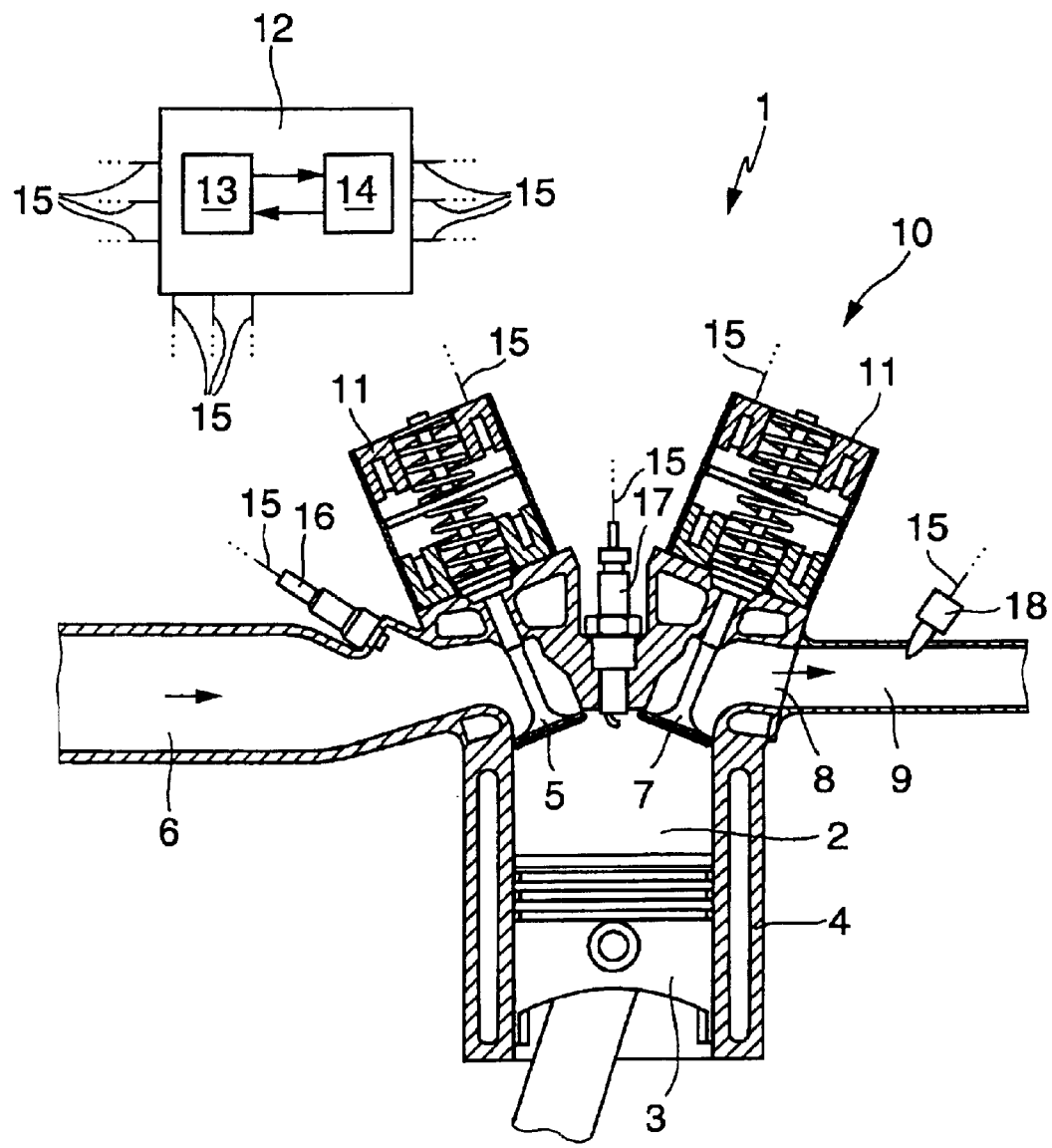

PISTON ENGINE AND ASSOCIATED OPERATING PROCESS

BACKGROUND OF THE INVENTION

The present invention relates to a process for operating a piston engine and a piston engine, in particular for a motor vehicle.

DE 198 19 937 C1 discloses an operating process for an electronic engine control system of a piston engine. The engine control system determines a current exhaust gas mass proportion from a current fuel/air mass ratio of a fresh gas supplied to a combustion chamber of the piston engine and from a current fuel/air mass ratio of an exhaust gas carried away from the combustion chamber after the combustion. The current exhaust gas mass proportion forms the contents of the combustion chamber together with a fresh gas mass proportion after the fresh gas has been supplied and before combustion.

It is of particular interest to know the exhaust gas mass proportion, which can also be referred to as the "residual gas proportion", as accurately as possible if the operating behavior of the piston engine is to be optimized, particularly with regard to fuel consumption, emission of pollutants and the efficiency of the engine. Modern internal combustion engines (for example petrol engines with direct fuel injection, diesel engines with direct fuel injection, diesel engines with common rail fuel injection) may be equipped with an exhaust gas recirculation device in order to reduce the emissions of pollutants and the fuel consumption. Here, part of the combustion output is returned to the combustion stage through a corresponding return line leading from the exhaust tract to the fresh air supply tract. In the process, such an external exhaust gas recirculation system changes the fuel/air mass ratio of the mixture introduced into the particular cylinder and therefore has a significant influence on the combustion process taking place there. In addition, this also changes the composition of the exhaust gases, the power output and the smooth running of the piston engine.

In addition to this external exhaust gas recirculation, the operating behavior of the piston engine is also influenced by internal exhaust gas recirculation which is formed, for example, by a dead volume which cannot be displaced from the associated cylinder by a piston. Furthermore, during the charging of the mixture into the cylinder, there is also an overlapping of the closing motion of the exhaust valve or valves and the opening motion of the intake valve or valves, which overlapping causes exhaust gases to flow back, the latter having already been displaced from the cylinder into the exhaust tract.

With the aid of the known engine control system, the contents of the cylinders, which contents are formed from the supply of a fresh fuel/air mixture, the external exhaust gas recirculation and the internal exhaust gas recirculation, can be determined relatively precisely, so that, with the aid of a suitable open or closed loop control system, the operating behavior of the piston engine can be influenced as a function of the contents of the cylinders.

SUMMARY OF THE INVENTION

An object of the present invention is to provide an operating process and a piston engine which improves the operation of the engine, particularly in terms of emissions of pollutants, fuel consumption and smooth running.

This object has been achieved based on the general recognition of combining an engine control system, constructed in such a way that it is capable of determining a current actual value of the exhaust gas mass proportion, with a valve actuator which permits variable opening and closing times for the valves. Such valve actuators do not operate by way of camshafts but rather by actuators which can be actuated individually, and one separately assigned to the valves. In this way, for example, the opening and closing of the individual valves can be actuated independently of the engine speed and, in particular, independently of each other. Such valve actuators are, for example, known in the form of electromagnetic valve actuating systems (so-called EMV systems), for which reason they do not need to be described in any greater detail.

The combination according to the invention is implemented in such a way that the engine control system actuates the valve control system as a function of the determined current actual value of the exhaust gas mass proportion in order to set a desired value for the exhaust gas mass proportion. With the present invention, the valve actuator is thus used to set a desired value for the exhaust gas mass proportion in the cylinders, for example by suitably overlapping the closing time of the intake valve with the opening time of the exhaust valve. By virtue of the variability of such a valve actuator, the desired value can be set with a relatively high degree of accuracy, as a result of which the operation of the engine can be improved, for example, in terms of emissions of pollutants, fuel consumption and smooth running.

Here, one embodiment in which the engine control system can determine the current actual value of the exhaust gas mass proportion to the highest possible degree of accuracy is of particular interest. In above-mentioned DE 198 19 937 C1, the contents of which are incorporated herein by reference, a suggestion is made to determine the current actual value of the exhaust gas mass proportion from the current fuel/air mass ratio of the fresh gas supplied to the cylinders and from the current fuel/air mass ratio of the exhaust gas carried away from the cylinders after combustion. Preferred embodiments of this specific procedure are described in more detail in DE 198 19 937 C1. The operating behavior of the piston engine can be additionally optimized by virtue of the combination, according to the present invention, of a process which determines the actual value of the exhaust gas mass proportion relatively precisely with a valve actuator which sets the desired value for the exhaust gas mass proportion relatively precisely.

It is basically contemplated to determine the current actual value of the exhaust gas mass proportion over all cylinders simultaneously, for example by measuring the current fuel/air mixture of the exhaust gas in the combined exhaust gas flow, i.e. downstream of the point at which the partial exhaust gas flows coming from the individual cylinders convene. If the piston engine is operating with an exhaust gas recirculation system, it may be advantageous in certain states of operation to set the highest possible exhaust gas recirculation rates. As the mixture formation in the individual cylinders can vary, particularly under load changes, there is a risk that, at extremely high exhaust gas recirculation rates, the exhaust gas content in individual cylinders may become so high that misfiring, emissions of pollutants and noise levels perceived as disturbing may occur.

In order to offer a remedy for this, in a further development of the present invention, the engine control system can individually determine the associated actual value of the exhaust gas mass proportion for each cylinder, and can individually actuate the valve actuator for each cylinder in order to set the desired value for the exhaust gas mass proportion in the particular cylinder. This is achieved, for example, with the aid of appropriate probes for measuring the current fuel/air mass ratio, one such probe being assigned to each of the cylinders. By virtue of this measure, it is possible to determine the current actual value locally in each cylinder and set the desired value locally in each cylinder. As a result, the overall operating behavior of the piston engine can be improved. In particular, higher exhaust gas recirculation rates can now be set.

In another specific embodiment, one desired value for the exhaust gas mass proportion can be assigned to each of a plurality of steady or quasi-steady operating states. The engine control system calculates a transition path at the transition between two steady or quasi-steady operating states from the two desired values for the exhaust gas mass proportion which are assigned to these operating states. The transition path has at least one intermediate desired value lying between the two desired values, and the engine control actuates the valve actuator in such a way that the actual values for the exhaust gas mass proportion follow this transition path. If, for example, the operation of the engine is to be switched over from a medium load to a low load, then under the conventional process an excessively high exhaust gas mass proportion could be present, at least for a short time, in the cylinders. By virtue of the process suggested according to the invention, the exhaust gas mass proportion can also be optimized in such transient operating states. Consequently, the above-mentioned parameters of the piston engine, for example the exhaust emissions and the fuel consumption, can be improved.

Of particular interest is also an embodiment in which the engine control system actuates the valve actuator in such a way that the exhaust gas recirculation is achieved with internal exhaust gas recirculation alone. By virtue of this measure, an external exhaust gas recirculation system can be eliminated along with the associated expense and effort in terms of design and equipment. By implementing the corresponding programs in the engine control system, the exhaust gas recirculation can thus be retrospectively equipped with an exhaust gas recirculation system in a piston engine having a valve actuator, for example an EMV system, permitting variable valve timing, and a programmable engine control system.

It is expedient if the engine control system actuates the valve actuator in the sense of an open loop and/or closed loop control arrangement. If a closed loop control performing a comparison of desired value against actual value of the exhaust gas mass proportion is used exclusively, then it should be ensured that the particularly short control times can be achieved. It is expedient to combine an open loop control system with a closed loop control system in such a way that desired values assigned to certain operating states are initially set (more or less coarsely) by an open loop actuation of the valve actuator, and are then constantly readjusted by a comparison with the current actual values in a closed loop control.

BRIEF DESCRIPTION OF THE DRAWINGS

These and other objects, features and advantages of the present invention will become more readily apparent from the following detailed description of currently preferred configurations thereof when taken in conjunction with the accompanying drawings wherein:

The single FIGURE is a schematic diagram of a cross-sectional portion of a piston engine according to the invention.

DETAILED DESCRIPTION OF THE DRAWINGS

In the drawing, a piston engine 1 which is only partially shown, has a plurality of cylinders 2, of which only one is shown by way of example. In the cylinder 2 a piston 3 is adjustably mounted to permit a lifting motion along a cylinder wall 4. A mixture is supplied to the cylinder 2 in an open loop process through an intake valve 5 from a supply 6. After a combustion cycle the exhaust gas then contained in the cylinder 2 is carried away in an open loop process through an exhaust valve 7 through an outlet 8, or is supplied in an open loop process to a exhaust tract 9 which is not otherwise illustrated. It is also contemplated that a plurality of intake valves 5 and/or a plurality of exhaust valves 7 can be assigned to the cylinder 2.

According to the invention, the piston engine 1 is equipped with a valve actuator designated generally by numeral 10 which permits variable closing and opening times for the valves 5, 7. In the currently preferred illustrated embodiment, an electromagnetic actuator 11 is assigned to each valve 5, 7, so that the present system is an electromagnetic valve adjusting system 10, i.e., an EMV system 10.

The piston engine 1 furthermore has an engine control system 12 which is expediently equipped with a processor 13 and a memory 14 which exchanges data with the processor 13. By way of corresponding signal, connecting and control lines 15, the engine control system 12 is, for example, connected to an injector 16 which is assigned to the cylinder 2, a spark plug or glow plug 17, which is assigned to the cylinder 2, and to the actuators 11 of the valve actuator 10. The engine control system 12 is additionally connected via corresponding lines 15 to a sensor system incorporates, for example, a probe 18 which is arranged in the exhaust tract 9. Furthermore, this sensory mechanism can, for example, comprise a sensor for determining the mass of the fresh air intake. The probe 18 arranged in the exhaust gas tract 9 is expediently a lambda probe 18, with the aid of which lambda probe 18 the oxygen content in the exhaust gas can be measured. According to a currently preferred embodiment, one such probe 18 can be assigned to each cylinder 2, which probe 18 is then expediently arranged on an exhaust pipe connecting the outlet 8 to an exhaust gas collector of the exhaust tract 9.

Due an unavoidable dead volume at the upper reversal point of the piston 3, an exhaust gas mass proportion $r_R$, referred to as the residual gas proportion, of exhaust gases remains in the cylinder 2 after every combustion cycle. Furthermore, due to an overlapping of open positions of the valves 5, 7, exhaust gases from the outlet 8 can flow back into the cylinder 2. In addition, early opening times of the intake valves 5 in conjunction with early closing times of the exhaust valves 7 may cause exhaust gases to enter into the supply 6 and to then flow back into the cylinder 2.

The engine control system 12 can preferably continuously measure the oxygen content of the exhaust gases with the aid of the lambda probe 18 in order to determine the exhaust gas mass proportion $r_R$. For this purpose the lambda probe 18 generates, for the engine control system, a signal value $S_a$ which correlates to a fuel/air mass ratio $\phi_z$ for the exhaust gases. This signal value $S_a$ is supplied via the corresponding line 15 to the engine control system 12. From this signal value $S_a$ and from a signal value $S_f$ which correlates to a fuel/air mass ratio $\phi_f$ for the fresh gas and is in any case already known to the engine control system 12, the engine control system 12 or its processor 13 generates a signal value $S_{RGA}$ correlating to the exhaust gas mass proportion $r_R$ with the aid of suitable programs.

With the aid of this signal value $S_{RGA}$, the engine control system 12 can then influence the operating state of the piston engine 1 in various ways. According to the invention, the engine control system 12 actuates the valve actuator 10 or the actuators 11 of the latter as a function of the current actual value of the exhaust gas mass proportion $r_R$ determined in this manner. The valve actuator 10 is actuated hereby in such a way that a desired value for the exhaust gas mass proportion $r_R$ in the cylinder 2 is set by purposeful variation of the opening and closing times of the valves 5, 7. In addition, the actuation of the injector 16 and/or the spark plug 17 can be coordinated with the actuation of the valve actuator 10 as a function of the actual value of the exhaust gas mass proportion $r_R$. Here, the object can be to achieve an operating behavior of the piston engine 1 having particularly low values for pollutant emissions and fuel consumption as well as high running refinement.

As has already been explained further above, one advantageous embodiment of the engine control system 12 can determine the associated actual value of the exhaust gas mass proportion $r_R$ individually for each cylinder 2 of the piston engine 1, and can then actuate the valve actuator 10 accordingly for each cylinder 2 individually in order to set the required desired value for the exhaust gas mass proportion $r_R$.

The desired values for the exhaust gas mass proportion $r_R$ can be stored, for example in corresponding characteristic maps, for a multitude of steady or quasi-steady operating states of the piston engine 1. At the transition between two steady or quasi-steady operating states, the engine control system 12 can determine a transition path from the desired values for the exhaust gas mass proportion $r_R$ assigned to the two operating states, in order to compensate for the dynamic behavior of the exhaust gas mass proportion $r_R$, with the transition path having at least one intermediate desired value lying between the two desired values. The engine control system 12 then actuates the valve actuator 10 in such a way that the actual values of the exhaust gas mass proportion rR follow this transition path. This is achieved by ensuring that the actual values are adjusted from the one desired value via the at least one intermediate value to the other desired value.

In addition or as an alternative, the engine control system 12 can generate an internal exhaust gas recirculation through appropriate actuation of the valve actuator 10. The internal exhaust gas recirculation is great enough to make it possible to do without an external exhaust gas recirculation system. Sufficient exhaust gas recirculation can be realized without structural measures by implementing suitable program codes in the engine control system 12.

In rich operation of the engine 1, the signal value SRGA correlating to the exhaust gas mass proportion rR represents a value calculated by analogy with the equation:

$$r_R = \frac{\Phi_z - \Phi_f}{\Phi_z - \frac{1}{\Delta}}$$

in which:

$r_R$=exhaust gas mass proportion or residual gas proportion
$\Phi_z$=fuel/air mass ratio for the exhaust gas
$\Phi_f$=fuel/air mass ratio for the fresh gas
$\Delta$=stoichiometric fuel/air mass ratio.

In lean operation of the engine 1, the signal value $S_{RGA}$ correlating to the exhaust gas mass proportion $r_R$ represents a value calculated by analogy with the equation:

$$r_R = \frac{1 - \frac{\Phi_z}{\Phi_f}}{1 - \Phi_z \cdot \Delta}$$

in which:

$r_R$=exhaust gas mass proportion or residual gas proportion
$\Phi_z$=fuel/air mass ratio for the exhaust gas
$\Phi_f$=fuel/air mass ratio for the fresh gas
$\Delta$=stoichiometric fuel/air mass ratio.

Although the present invention has been illustrated and described with respect to exemplary embodiment thereof, it should be understood by those skilled in the art that the foregoing and various other changes, omission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

What is claimed is:

1. Process for operating a piston engine in which at least one intake valve and at least one exhaust valve are assigned to each cylinder of said piston engine and in which a valve actuator permits variable opening and closing times for the valves, comprising determining a current actual value of an exhaust gas mass proportion which forms the contents of each cylinder together with a fresh gas mass proportion after fresh gas has been supplied to each cylinder and before combustion, and actuating the valve actuator to set a desired value for the exhaust gas mass proportion, wherein the associated actual value of the exhaust gas mass proportion is individually determined for each cylinder and the valve actuator is actuated individually for each cylinder to set the desired value for the exhaust gas mass proportion, and exhaust gas recirculation is provided to operate with the piston engine at least in certain operating states, and the engine control system is configured to actuate the valve actuator so that an exhaust gas recirculation is achieved solely by an internal exhaust gas recirculation.

2. Process for operating a piston engine in which at least one intake valve and at least one exhaust valve are assigned to each cylinder of said piston engine and in which a valve actuator permits variable opening and closing times for the valves, comprising determining a current actual value of an exhaust gas mass proportion which forms the contents of each cylinder together with a fresh gas mass proportion after fresh gas has been supplied to each cylinder and before combustion, and actuating the valve actuator to set a desired value for the exhaust gas mass proportion, wherein one desired value for the exhaust gas mass proportion $r_R$ is assigned to each of a plurality of steady or quasi-steady operating states of the piston engine, further comprising determining, during a transition between two steady or quasi-steady operating states, a transition path from the two desired values for the exhaust gas mass proportion assigned to these two operating states, said transition path having at least one intermediate desired value lying between the two desired values, and actuating the valve actuator such that actual values of the exhaust gas mass proportion follow said transition path.

3. Process according to claim 2, wherein the associated actual value of the exhaust gas mass proportion is individually determined for each cylinder and the valve actuator is actuated individually for each cylinder to set the desired value for the exhaust gas mass proportion.

4. Process for operating a piston engine in which at least one intake valve and at least one exhaust valve are assigned to each cylinder of said piston engine and in which a valve actuator permits variable opening and closing times for the valves, comprising determining a current actual value of an exhaust gas mass proportion which forms the contents of each cylinder together with a fresh gas mass proportion after fresh gas has been supplied to each cylinder and before combustion, and actuating the valve actuator to set a desired value for the exhaust gas mass proportion, wherein one desired value for the exhaust gas mass proportion $r_R$ is assigned to each of a plurality of steady or quasi-steady operating states of the piston engine, further comprising determining, during a transition between two steady or quasi-steady operating states, a transition path from the two desired values for the exhaust gas mass proportion assigned to these two operating states, said transition path having at least one intermediate desired value lying between the two desired values, and actuating the valve actuator such that actual values of the exhaust gas mass proportion follow said transition path.

5. Process according to claim 4, wherein the associated actual value of the exhaust gas mass proportion is individually determined for each cylinder and the valve actuator is actuated individually for each cylinder to set the desired value for the exhaust gas mass proportion.

6. Process according to claim 1, wherein the valve actuator is actuated as at least one of an open loop and a closed loop control arrangement.

7. Process according to claim 1, further comprising additionally varying at least one of one ignition time, one injection duration, one injection time and a number of injection processes to set the desired value for the exhaust gas mass proportion.

8. Process for operating a piston engine in which at least one intake valve and at least one exhaust valve are assigned to each cylinder of said piston engine and in which a valve actuator permits variable opening and closing times for the valves, comprising determining a current actual value of an exhaust gas mass proportion which forms the contents of each cylinder together with a fresh gas mass proportion after fresh gas has been supplied to each cylinder and before combustion, and actuating the valve actuator to set a desired value for the exhaust gas mass proportion, wherein the current actual value of the exhaust gas mass proportion is determined from a current fuel/air mass ratio of a fresh gas supplied to the cylinders and from a current fuel/air mass ratio of an exhaust gas carried away from the cylinders after the combustion.

9. Piston motor for a motor vehicle and the like, comprising a plurality of cylinders, each of which has at least one intake valve and at least one exhaust valve, an engine control system configured to determine a current actual value of an exhaust gas mass proportion which forms the contents of the cylinders together with a fresh gas mass proportion after fresh gas has been supplied and before combustion, and a valve actuator configured to permit variable opening and closing times for the valves, wherein the engine control system is configured to actuate the valve actuator to set a desired value for the exhaust gas mass proportion wherein, exhaust gas recirculation is provided to operate with the piston engine at least in certain operating states, and the engine control system is configured to actuate the valve actuator so that an exhaust gas recirculation is achieved solely by an internal exhaust gas recirculation.

10. Piston engine for a motor vehicle and the like, comprising a plurality of cylinders, each of which has at least one intake valve and at least one exhaust valve, an engine control system configured to determine a current actual value of an exhaust gas mass proportion which forms contents of the cylinders together with a fresh gas mass proportion after fresh gas has been supplied and before combustion, and a valve actuator configured to permit variable opening and closing times for the valves, wherein the engine control system is configured to actuate the valve actuator to set a desired value for the exhaust gas mass proportion, wherein a probe is associated with each cylinder to measure the current fuel/air mass ratio of the exhaust gas carried away from the respective cylinder, and the engine control system is configured to determine an associated actual value of the exhaust gas mass proportion individually for each cylinder and to actuate the valve actuator individually for each cylinder to set the desired value for the exhaust gas mass proportion.

11. Piston engine for a motor vehicle and the like, comprising a plurality of cylinders, each of which has at least one intake valve and at least one exhaust valve, an engine control system configured to determine a current actual value of an exhaust gas mass proportion which forms contents of the cylinders together with a fresh gas mass proportion after fresh gas has been supplied and before combustion, and a valve actuator configured to permit variable opening and closing times for the valves, wherein the engine control system is configured to actuate the valve actuator to set a desired value for the exhaust gas mass proportion, wherein the engine control system is configured to have access to characteristic maps in which one desired value for the exhaust gas mass proportion is assigned to each of a plurality of steady or quasi-steady operating states of the piston engine, such that, during a transition between two steady or quasi-steady operating states, the engine control system determines a transition path from the two desired values for the exhaust gas mass proportion assigned to these two operating states, with said transition path having at least one intermediate desired value lying between the two desired values, and actuates the valve actuator such that the actual values of the exhaust gas mass proportion follow this transition path.

12. Piston engine according to claim 1, wherein a probe is associated with each cylinder to measure the current fuel/air mass ratio of the exhaust gas carried away from the respective cylinder, and the engine control system is configured to determine an associated actual value of the exhaust gas mass proportion individually for each cylinder and to actuate the valve actuator individually for each cylinder to set the desired value for the exhaust gas mass proportion.

13. Piston engine according to claim 9, wherein the engine control system is configured to actuate the valve actuator as at least one of an open loop and closed loop control arrangement.

14. Piston engine according to claim 9, wherein the valve actuator is comprised of an electromagnetically operating valve adjusting system.

15. Piston engine according to claim 9, wherein the engine control system is configured to additionally vary at least one of one ignition time, one injection duration, one injection time and a number of injection processes to set the desired value for the exhaust gas mass proportion.

16. Piston engine for a motor vehicle and the like, comprising a plurality of cylinders, each of which has at least one intake valve and at least one exhaust valve, an engine control system configured to determine a current actual value of an exhaust gas mass proportion which forms contents of the cylinders together with a fresh gas mass proportion after fresh gas has been supplied and before combustion, and a valve actuator configured to permit variable opening and closing times for the valves, wherein the engine control system is configured to actuate the valve actuator to set a desired value for the exhaust gas mass proportion, wherein the engine control system is configured to determine the current actual value of the exhaust gas mass proportion from a current fuel/air mass ratio of a fresh gas supplied to the cylinders and from a current fuel/air mass ratio of an exhaust gas carried away from the cylinders after combustion.

* * * * *